US011975658B2

(12) United States Patent
Nagolu et al.

(10) Patent No.: US 11,975,658 B2
(45) Date of Patent: May 7, 2024

(54) CONTROLLED DETACHMENT FEATURES OF STEERING COLUMN MOUNTED CAMERA

(71) Applicant: VEONEER US, INC., Southfield, MI (US)

(72) Inventors: Chakravarthi Mallikarjun Nagolu, Shelby Township, MI (US); Francis Joseph Judge, South Lyon, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 168 days.

(21) Appl. No.: 17/613,365

(22) PCT Filed: May 26, 2020

(86) PCT No.: PCT/US2020/034536
§ 371 (c)(1),
(2) Date: Nov. 22, 2021

(87) PCT Pub. No.: WO2020/243084
PCT Pub. Date: Dec. 3, 2020

(65) Prior Publication Data
US 2022/0219621 A1 Jul. 14, 2022

Related U.S. Application Data

(60) Provisional application No. 62/852,737, filed on May 24, 2019.

(51) Int. Cl.
*B60R 11/04* (2006.01)
*B60K 35/00* (2006.01)
(Continued)

(52) U.S. Cl.
CPC .............. *B60R 11/04* (2013.01); *B60K 35/00* (2013.01); *H04N 23/54* (2023.01); *H04N 23/57* (2023.01);
(Continued)

(58) Field of Classification Search
CPC ............... B60R 11/04; B60R 2011/001; B60R 2011/0059; B60R 2011/0071;
(Continued)

(56) References Cited

U.S. PATENT DOCUMENTS 6,824,281 B2   11/2004   Schofield et al.
7,448,812 B2   11/2008   Heibel
(Continued)

FOREIGN PATENT DOCUMENTS

CN   107042795 A   8/2017
CN   108891477 A   11/2018
(Continued)

OTHER PUBLICATIONS

International Search Report of PCT/US2020/34536, dated Aug. 12, 2020.

*Primary Examiner* — Girumsew Wendmagegn
(74) *Attorney, Agent, or Firm* — DICKINSON WRIGHT PLLC

(57) ABSTRACT

A camera assembly adapted for mounting to an interior of a motor vehicle on an upper surface of the steering column assembly. The camera assembly has mounting features interacting with a mounting structure that cause the camera assembly to separate from the mounting structure upon the occurrence of a collision with an object or through inertial forces acting on the camera assembly. The separation in such conditions is provided in a controlled manner through the use of cam or ramp surfaces provided in the camera assembly or mounting structure. A cable or tether may be attached (Continued)

to the camera assembly and mounted to the vehicle to further control movement of the camera assembly after separation.

15 Claims, 5 Drawing Sheets

(51) Int. Cl.
 *H04N 23/54* (2023.01)
 *H04N 23/57* (2023.01)
 *B60K 35/22* (2024.01)
 *B60R 11/00* (2006.01)

(52) U.S. Cl.
 CPC ........ *B60K 35/22* (2024.01); *B60K 2360/691* (2024.01); *B60R 2011/001* (2013.01); *B60R 2011/0059* (2013.01); *B60R 2011/0071* (2013.01)

(58) Field of Classification Search
 CPC .............. B60K 35/00; B60K 2370/152; B60K 2370/691; H04N 23/54; H04N 23/57; G03B 30/00; G03B 17/561
 See application file for complete search history.

(56) References Cited

U.S. PATENT DOCUMENTS

| | | | |
|---|---|---|---|
| 8,791,835 | B2 | 7/2014 | Zhang |
| 10,252,684 | B2 | 4/2019 | Miyado et al. |
| 2003/0169522 | A1 | 9/2003 | Schofield et al. |
| 2005/0265711 | A1* | 12/2005 | Heibel .................. F16M 11/42 396/419 |
| 2010/0288573 | A1* | 11/2010 | Nishina .................. B60R 11/04 180/272 |
| 2013/0082874 | A1 | 4/2013 | Zhang |
| 2016/0009230 | A1 | 1/2016 | Miyado et al. |
| 2017/0225628 | A1 | 8/2017 | Aich et al. |

FOREIGN PATENT DOCUMENTS

| | | |
|---|---|---|
| JP | 2007069680 A | 3/2007 |
| JP | 2016203772 A | 12/2016 |
| WO | 03/065084 A1 | 8/2003 |

* cited by examiner

CONTROLLED DETACHMENT FEATURES OF STEERING COLUMN MOUNTED CAMERA

CROSS-REFERENCE TO RELATED APPLICATIONS

This application is a 35 U.S.C. § 371 national phase of PCT International Application No. PCT/US2020/34536, filed May 26, 2020, which claims the benefit of priority under 35 U.S.C. § 119 to United States Provisional Application No. 62/852,737, filed May 24, 2019, the contents of which are incorporated herein by reference in their entirety.

FIELD OF THE INVENTION

The present application generally relates to camera assembly for mounting in the interior of a motor vehicle.

BACKGROUND

Present motor vehicles incorporate numerous features for the control of vehicle functions and to provide a comfortable environment for vehicle occupants while providing access to information, media and communication functions. Another primary objective is to provide occupant protection. Occupant protection approaches can be divided into two primary areas; active and passive safety. Passive safety features include inflatable restraints, seatbelts and other functions deployed upon the occurrence of a vehicle impact or rollover event. Active safety functions are intended to reduce the likelihood of an impact, and include such features as blind spot detection, adaptive cruise control and other advanced driver assist systems (ADAS). Some technologies are enabled through the use of vehicle interior-mounted displays and cameras. An interior camera oriented toward the driver can be used for communication functions and can also monitor driver alertness and their position relative to the vehicle steering wheel and other structures. One location for mounting these devices is on the upper surface of a vehicle steering column. There are numerous challenges posed by providing such a mounting location. Steering columns are designed with crushable structures to absorbed impact energy upon a frontal impact. Typically a driver airbag is carried by the vehicle steering wheel and inflates to absorb impact energy. Whether or not a driver airbag inflates, compressive loads are placed on the steering column and its energy absorbing crushable features and enable it to stroke to absorb energy. Any cameras or other device mounted on the upper portion of the steering column need to accommodate such displacement and loading conditions.

Column mounted camera systems on the steering wheel pose a problem of becoming a hazard in a crash situation. Conventional MHI displays are provided in the vehicle instrument panel. In some applications, it is desirable to provide the display near the upper surface of the steering column. This forward positioning gives access to the driver for proper HMI input from the driver. Mounting any kind of module such as a camera in front of these displays may have adverse effects in a crash situation, as the packaging in and around the steering wheel is very dense and is sensitive and prone to damage due to mechanical vibration and shock. In a crash situation it is important that components not be free to move in an uncontrolled manner in the vehicle interior which could pose an occupant injury risk. In addition, the devices must not interfere with the proper deployment of an inflatable restraint carried by the steering wheel hub or other mounting positions. Further, it is desirable to protect the sensitive and expensive display components from mechanical damage in an impact or any other condition where a camera might become dislodged from its mounted position in front of the display.

SUMMARY

In accordance with the present invention a camera module mountable in a vehicle is provided. The camera module includes a camera and a mount. The mount is preferably adapted to be positioned at the upper surface of a vehicle steering column. The camera assembly is affixed to the mount through snap features that are configured to release though cam features during an impact to control the direction of the camera during dislodgement. A tether can be used attached to the camera assembly to further constrain its motion after detachment.

DETAILED DESCRIPTION

Figure 1:
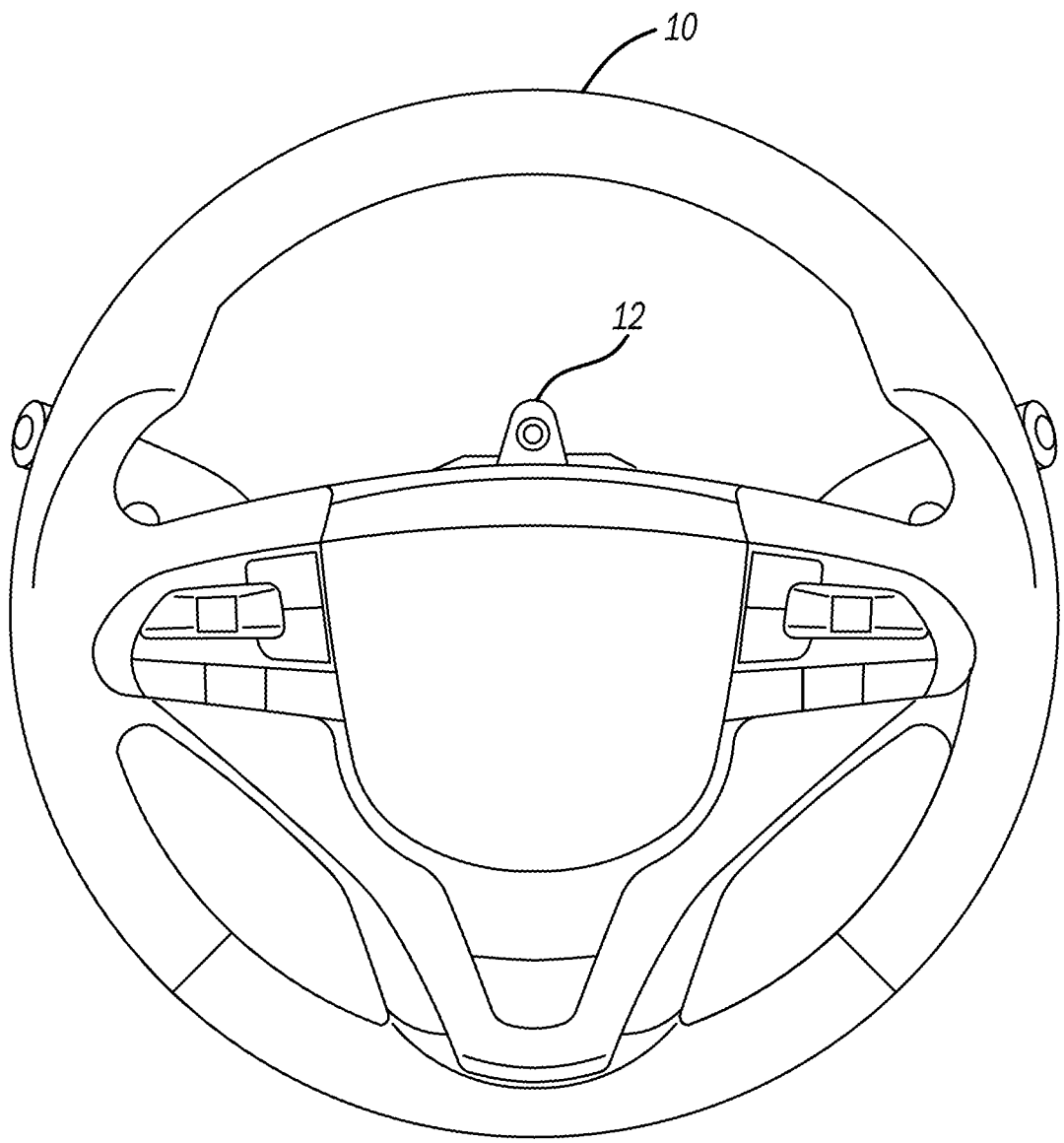
FIG. 1 is a frontal view of a motor vehicle steering wheel.

FIG. 1 illustrates an example of a motor vehicle steering wheel assembly 10 shown from the perspective of a driver position behind the steering wheel. A small portion of camera assembly 12 can be seen in the upper open quadrant of steering wheel assembly 10.

Figure 2:
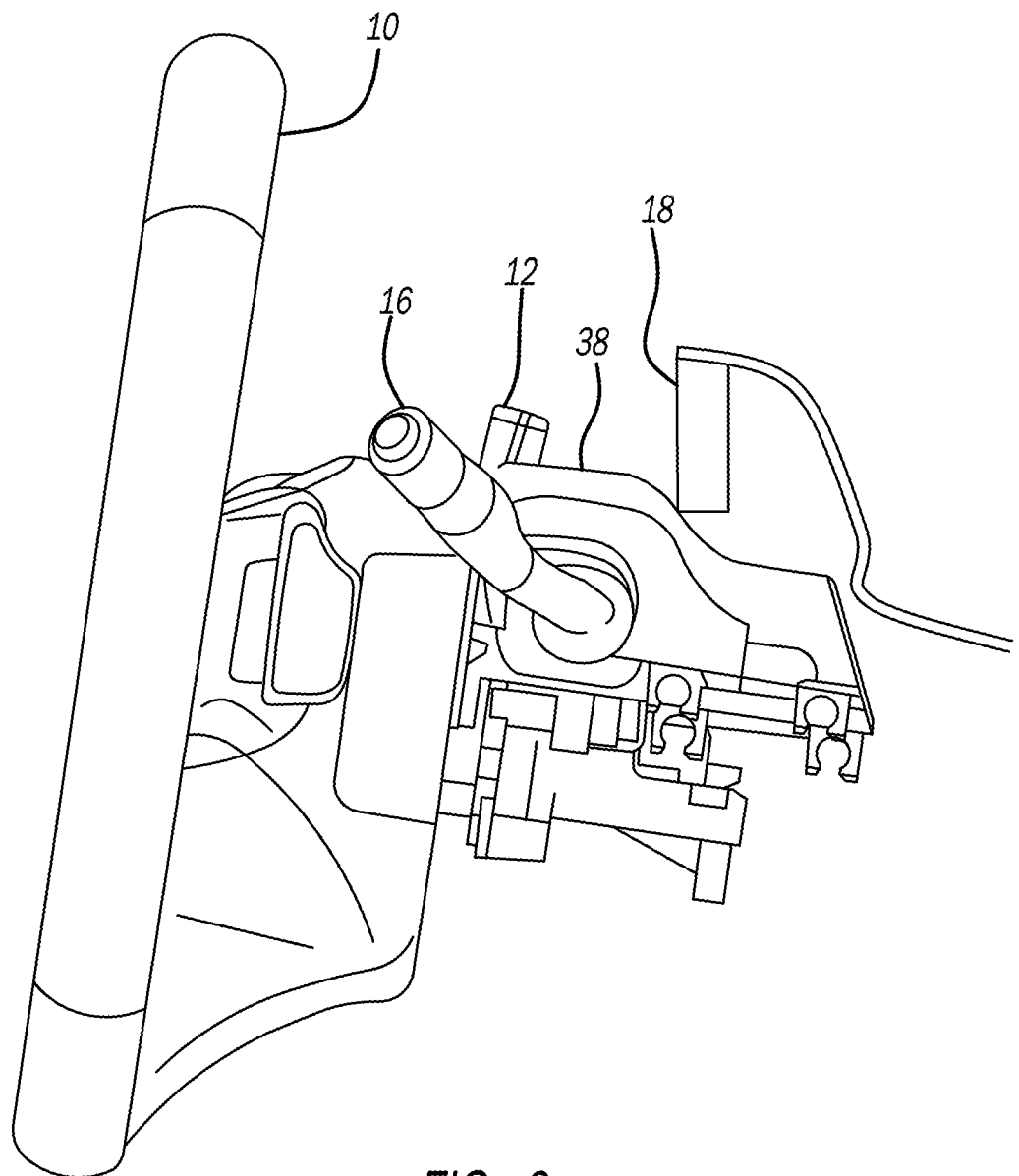
FIG. 2 is a side view of a motor vehicle steering wheel and steering column showing locations for mounting a display and camera assembly.

FIG. 2 is a side view of steering wheel assembly 10 showing steering column 14 and control stalk 16 and the position of display 18, normally integrated into the vehicle's instrument panel. As shown, there is a close spacing in the fore-and-aft (vehicle forward traveling) direction between camera assembly 12 and display 18. For reasons discussed previously, it is desirable to protect display 18 from damage and otherwise to control the movement of camera assembly 18 should it become dislodged from its mounted position in an impact or other event.

Figure 3:
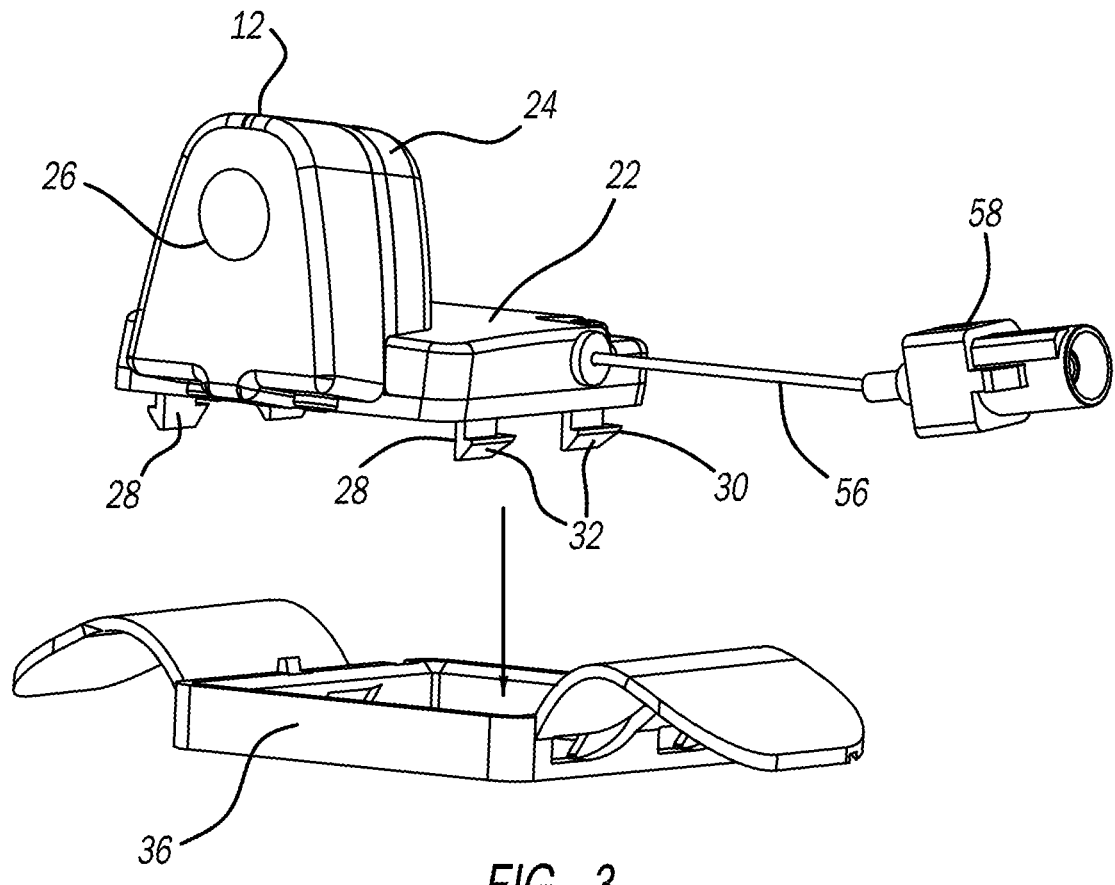
FIG. 3 is a pictorial view of a camera assembly detached from its mounting structure.

FIG. 3 provides a pictorial view of camera assembly 12. As shown camera assembly 12 includes a generally flat housing base 22 and upwardly extending panel 24 providing a mount for an imaging sensor and associated optical components 26 (not shown in detail). On the bottom surface of panel 24 there is provided four downwardly projecting legs 28 each having lower ramped barbs or teeth 30. Teeth 30 feature a ramped lower surface 32 and a forward projecting barb 34. Housing base 22 features four of teeth 30 with a pair aligned on each lateral side of the base, although other numbers could be provided.

Figure 4:
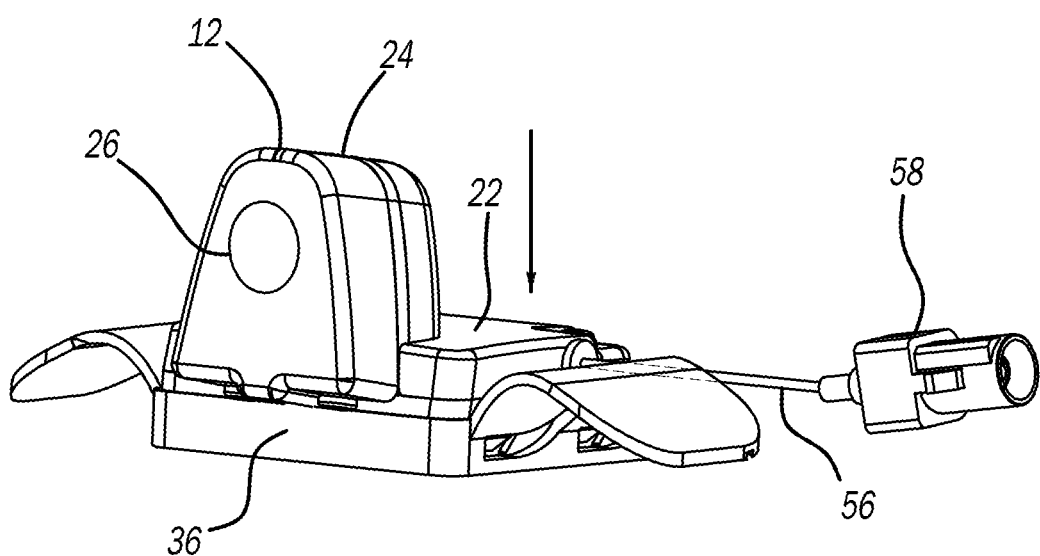
FIG. 4 is a pictorial view of the camera assembly affixed to its mounting structure.
Figure 5:
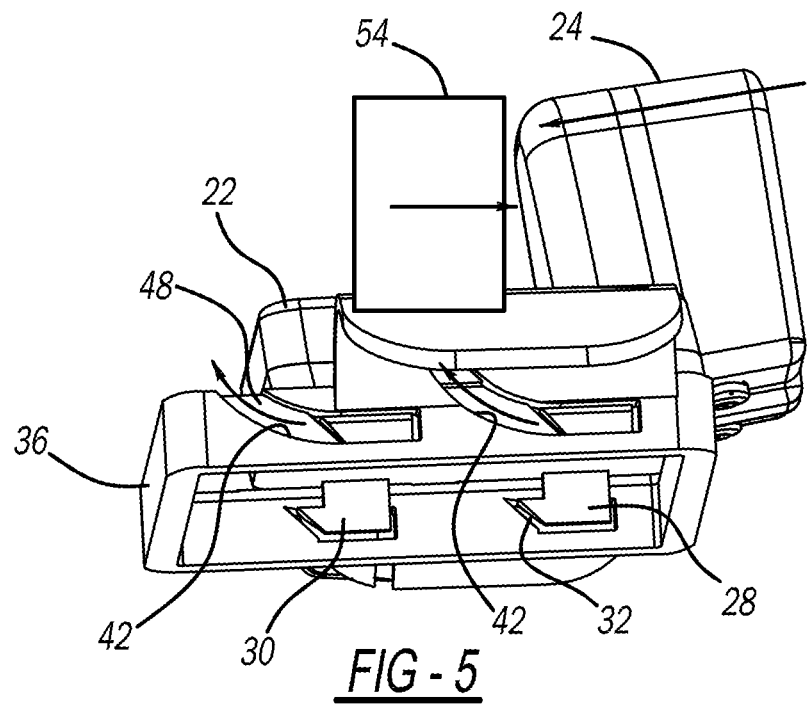
FIG. 5 is a pictorial view showing the camera assembly in a mounted position and showing exemplary inertial forces acting on the camera assembly.
Figure 6:
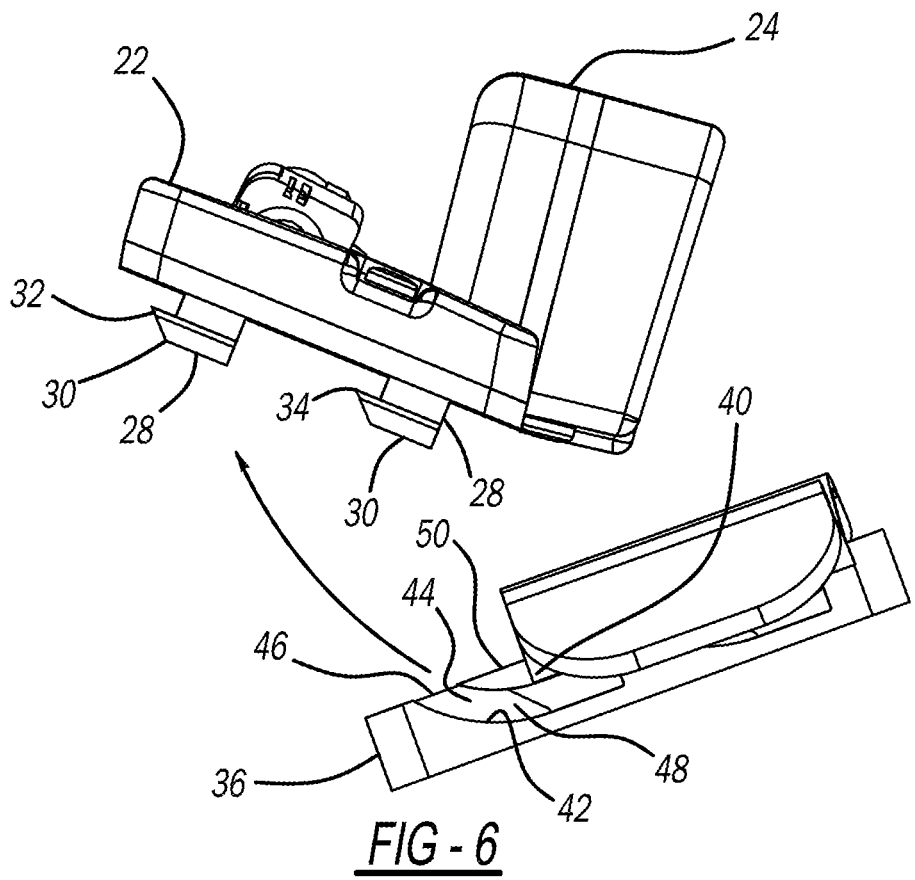
FIG. 6 is a side view showing the camera assembly dislodged from the mounting structure.

FIG. 4-6 show camera assembly 12 mounted to camera mounting structure 36. Camera mounting structure 36 may be a separately formed component affixed (removably or permanently) to steering column shroud 38 or may have its features integrated into a larger part of shroud 38 (or another component). Mounting structure 36 incorporates rectangular first apertures 40 for receiving legs 28 for locking in place camera assembly 12. Referring in particular to FIG. 5, legs 28 are received into apertures 40 which are dimensioned to cause deflection of the legs, squeezing them together laterally and then allowing them to snap into a final install position with teeth 30 engaged with a underside surface below apertures 40. In accordance with this invention features are provided for causing the separation between camera assembly 12 and mounting structure 36 to happen in a controlled and predicted manner. For example, inertial forces may act on camera assembly 12 in an impact or other obstacles such as an inflating airbag or other forces may act on camera assembly 12, causing it to become detached from mounting structure 36.

Referring to FIGS. 5 and 6, mounting structure 36 includes first apertures 40 for receiving legs 28 and second aperture 46 separated from aperture 40. Cavity 48 extends between the two apertures 40 and 46, with tab feature 50 between them. Tab feature 50 provides a weakened area which will fail when loads act on camera assembly 12 as will be described further as follows. In the installed position, leg teeth 30 snap in position with barbs 34 hooked onto a lower surface of mounting structure 36. Mounting structure 36 provides curved ramp (or cam) surfaces 42 creating a curved pathway 44 for movement of legs 28 in the event that loads act on camera assembly 12 causing it to become dislodged. Curved pathway 44 extends between the two apertures and provides a surface for legs 28 to ride along upon the occurrence of camera assembly 12 being released from mounting structure 36. The ramp or cam surfaces 42 may be radiused forward and upward (in the vehicle forward travel direction) to assist and control pivoting of camera module 12 during dislodgment.

FIG. 5 shows camera assembly 12 fastened in position to mounting structure 36. As shown, legs 28 are snapped into position. FIG. 5 shows an example colliding structure 54 contacting camera assembly 12. Colliding structure 54 is just an example of any object that might contact or act on camera assembly 12 causing it to become detached. Similar detachment can occur strictly through inertial forces acting on the camera assembly 12. Colliding structure 54 is only exemplary of any force input causing detachment of camera assembly 12.

Figure 7:
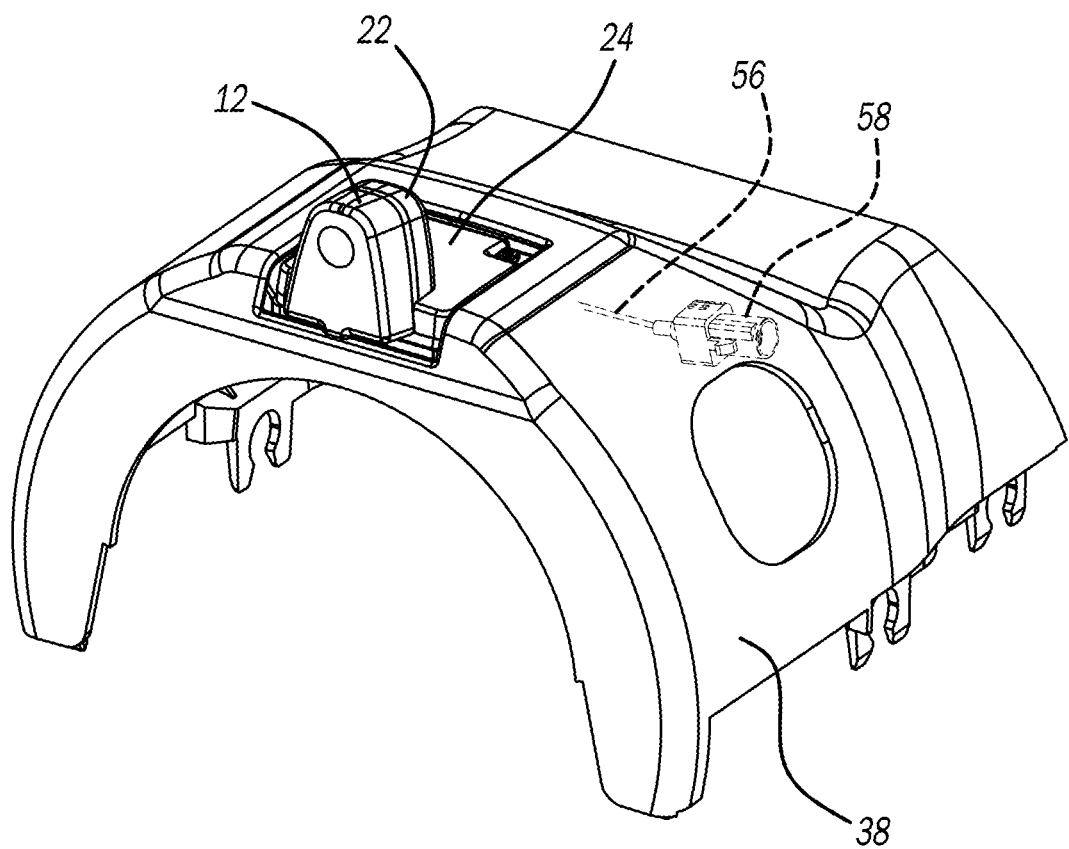
FIG. 7 is a pictorial view of the camera assembly mounted to the upper portion of a vehicle steering column.

As illustrated in FIG. 6, when sufficient loads are applied to camera assembly 12, tab feature 50 preferably fails to release the camera assembly. In the event of such detachment, legs 28 riding along ramp surfaces 42 produce an upward displacement of camera assembly 12 as it separates from mounting structure 36. This produces a predictable and controlled trajectory for camera assembly 12 upon its separation. As shown by FIGS. 3-4 and 7 cable 56 is attached to camera assembly 12 and includes an electrical connector 58. Cable 56 acts as a tether providing a structural connection to restrain motion of camera assembly 12 after release from the mounting structure 36. Preferably, cable 56 has necessary tensile properties with a suitable strong connection with camera assembly 12 and electrical connector 58 which would be attached to an associated vehicle interior component. Routing of cable 56 is shown in a diagrammatic manner in FIG. 7. In practice, cable 56 and electrical connector 58 would be enclosed by shroud 38 or other interior panels. The length of the cable 56 is chosen to prevent the fully dislodged camera assembly 12 from entering the airbag deployment zone or from traveling into the instrument display 18. Cable 56 may be attached to the side of camera assembly 12 such that the tension in the cable will direct the camera unit to the side when dislodged. In some implementation, more than one cable or tether may be used.

It is also contemplated within this disclosure that camera assembly 12 may be replaced by a different attachment unit or electronic unit and that the ramp surfaces 52 may be provided to extend or curve in another manner to direct the unit in a different direction. The weakened areas provided by tab portion 50 may be material within the mounting structure 36 that breaks away as the unit is dislodged. Camera assembly leg barbs 34 may have an edge that may be sharp to cut into or otherwise aid in the breaking away of the weakened areas during dislodgement.

Further, it is contemplated within this disclosure that the snap features and the ramp or cam features may be located on either the camera assembly or the mounting structure to control the direction of dislodgement of the camera during an impact.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

The invention claimed is:

1. A camera assembly and a mounting structure adapted to mount the camera assembly to a vehicle steering column within an interior of a motor vehicle, the camera assembly and mounting structure comprising;
    the camera assembly; and
    the mounting structure adapted to be integrated with or attached to the vehicle steering column, the camera assembly being affixed to the mounting structure through snap engagement features that are configured to release from the mounting structure though ramp surfaces during an impact to control a direction of travel of the camera assembly during a separation of the camera assembly from the mounting structure, the snap engagement features formed by a plurality of legs extending from a housing base of the camera assembly, the legs forming teeth, the teeth engageable with first apertures formed by the mounting structure and with second apertures formed adjacent to the first apertures and forming a cavity extending between the first and the second apertures, the cavity forming the ramp surfaces.

2. The camera assembly and the mounting structure of claim 1 further comprising, the teeth of the plurality of legs are engageable with the first and the second apertures to provide the snap engagement features.

3. The camera assembly and the mounting structure of claim 1 further comprising, upon the separation of the camera assembly from the mounting structure, the plurality of legs ride along the ramp surfaces to provide a controlled trajectory for the camera assembly.

4. The camera assembly and the mounting structure of claim 1 further comprising a tab feature formed between the first and the second apertures providing a weakened area for failing upon the occurrence of loads acting on the camera assembly allowing the camera assembly to separate from the mounting structure.

5. The camera assembly and the mounting structure of claim 1 wherein the ramp surfaces are curved in a forward direction relative to the vehicle.

6. The camera assembly and the mounting structure of claim 1 wherein the ramp surfaces are curved in an upward direction relative to the vehicle.

7. The camera assembly and the mounting structure of claim 1 wherein a cable or a tether is attached to the camera assembly and the vehicle interior to limit travel of the camera assembly during the separation.

8. The camera assembly and the mounting structure of claim 7 further comprising the tether is in the form of a cable with a cable connector, the cable extending in a lateral direction relative to the direction of a forward travel of the vehicle.

9. The camera assembly and the mounting structure of claim 7 wherein the cable or the tether is attached to a side of the camera assembly.

10. The camera assembly and the mounting structure of claim 1 further comprising four of the legs are provided for the camera housing base.

11. The camera assembly and the mounting structure of claim 1 wherein the camera assembly and the mounting structure are positioned on an upper surface of the steering column between a steering wheel and a vehicle interior display.

12. A camera assembly and a mounting structure adapted to mount the camera assembly to a vehicle steering column within an interior of a motor vehicle, the camera assembly and mounting structure comprising;
   the camera assembly; and
   the mounting structure adapted to be integrated with or attached to the vehicle steering column, the camera assembly being affixed to the mounting structure through snap engagement features that are configured to release from the mounting structure though ramp surfaces during an impact to control a direction of travel of the camera assembly during a separation of the camera assembly from the mounting structure,
   wherein the snap features further comprises teeth engaging with a tab feature forming an edge that is configured to aid in breaking away from the tab feature to facilitate a dislodgement of the camera assembly during the separation.

13. The camera assembly the mounting structure of claim 12 further comprising, the snap engagement features formed by a plurality of legs extending from a housing base of the camera assembly, the legs forming the teeth, the teeth engageable with first apertures formed by the mounting structure.

14. The camera assembly and the mounting structure of claim 12 further comprising, the mounting structure further forming first apertures and second apertures formed adjacent to the first apertures and forming a cavity extending between the first and the second apertures, the cavity forming the ramp surfaces.

15. A camera assembly and mounting structure adapted to mount the camera assembly to a vehicle steering column within an interior of a motor vehicle, the camera assembly and mounting structure comprising;
   the camera assembly; and
   the mounting structure adapted to be integrated with or attached to the vehicle steering column, the camera assembly being affixed to the mounting structure through snap engagement features that are configured to release from the mounting structure though ramp surfaces during an impact to control a direction of travel of the camera assembly during a separation of the camera assembly from the mounting structure,
   further comprising the vehicle having a display mounted in front of the camera assembly and the ramp surfaces oriented to reduce the likelihood of a collision between the camera assembly and the display upon the separation.

\* \* \* \* \*